United States Patent

Sugawara

[15] 3,656,912
[45] Apr. 18, 1972

[54] LIQUID SEPARATORY APPARATUS

[72] Inventor: Ken F. Sugawara, Painted Post, N.Y.
[73] Assignee: Corning Glass Works, Corning, N.Y.
[22] Filed: May 14, 1970
[21] Appl. No.: 37,149

[52] U.S. Cl. ..............................23/259, 23/292, 210/83, 210/515
[51] Int. Cl. ...................G01f 11/00, G01l 3/00, G01l 3/02
[58] Field of Search ..............23/259, 292; 210/83, 424, 515

[56] References Cited

UNITED STATES PATENTS

| | | | |
|---|---|---|---|
| 984,923 | 2/1911 | Jacobson et al. | 23/292 X |
| 1,049,411 | 1/1913 | Shaw | 23/292 |
| 3,257,170 | 6/1966 | Marcus et al. | 23/259 |
| 3,516,801 | 6/1970 | Shah | 23/292 |

Primary Examiner—Morris O. Wolk
Assistant Examiner—R. E. Serwin
Attorney—Clarence R. Patty, Jr. and Ernst H. Ruf

[57] ABSTRACT

A liquid separatory apparatus for analytical purposes including a first compartment, at least one second compartment, valve means interposed therebetween, and a closure means. The first compartment includes an inlet portion on one end, an outlet portion on the other end and serves to initially contain the liquid during its separation into at least two phases of differing density. Each second compartment has an inlet portion and an opening to atmosphere, with each inlet portion being operatively and separately connected by the valve means to the first compartment outlet portion; said valve means including a drain portion open to atmosphere. The closure means serves for closing the first compartment inlet portion and includes an opening to atmosphere while the second compartments serve as separate storage reservoirs for the desired phases of differing density while the undesired phases are drained from the apparatus. Each of the stored phases may then be separately transferred back to the first compartment upon partial inversion of the apparatus.

13 Claims, 4 Drawing Figures

PATENTED APR 18 1972
3,656,912
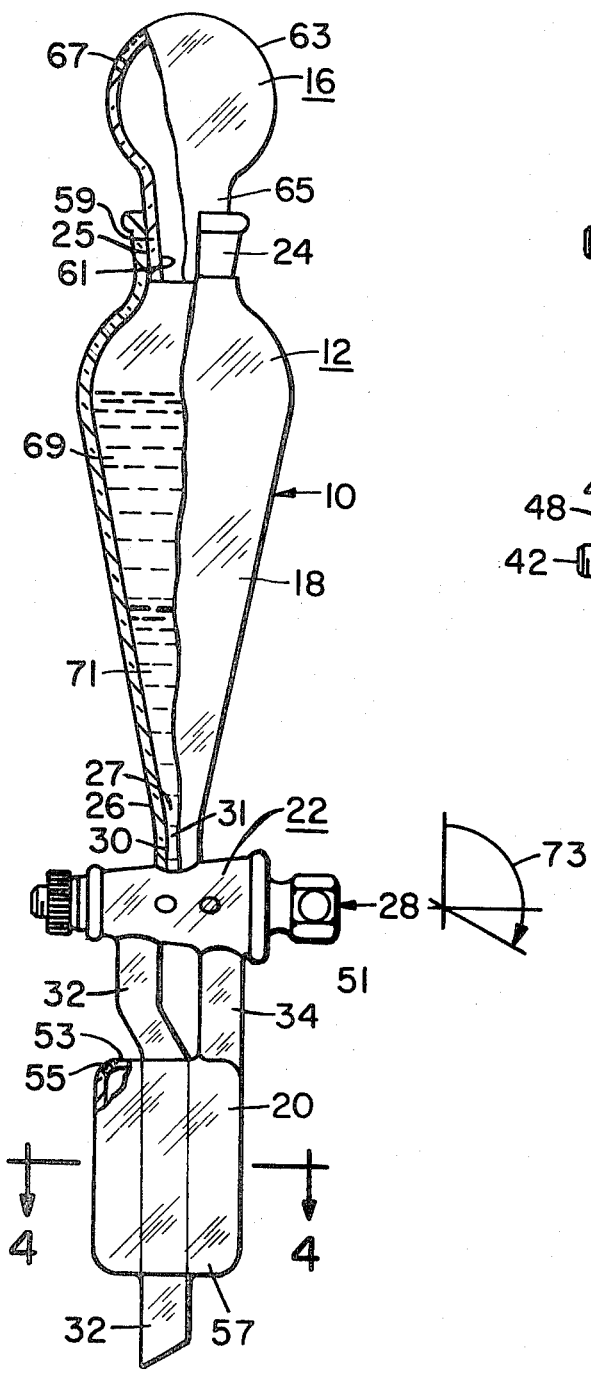
Fig. 1
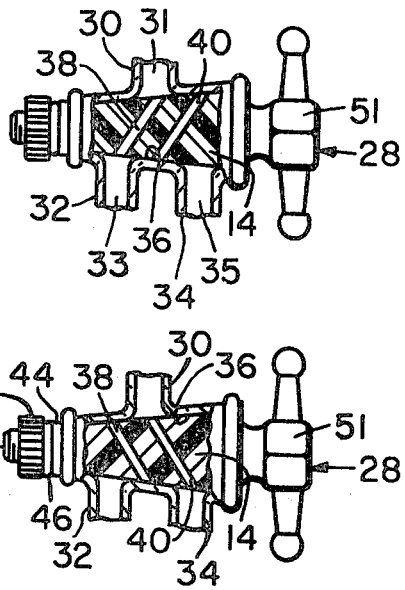
Fig. 2
Fig. 3
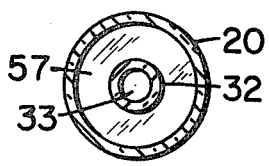
Fig. 4
INVENTOR.
Ken F. Sugawara
BY Ernst H. Ruf
ATTORNEY

LIQUID SEPARATORY APPARATUS

BACKGROUND OF THE INVENTION

1. Field of the Invention

This invention relates to apparatus for separating various fluids and in particular relates to a separatory funnel for accurately separating immiscible liquids.

2. Description of the Prior Art

The basic design of the traditional separatory funnel has not changed significantly since being introduced into the laboratory many years ago. The fact that present analytical extraction methods involve multiple extractions, back extractions, and scrubbing operations further complicates utilization of the technique. The main drawback in the design of the traditional separatory funnel consists of its inability to separate the organic phase when it is denser than the aqueous phase without complete transferal to another vessel. For example, in the case of a chloroform extraction, if it is necessary to scrub or back-extract the chloroform phase, a second separatory funnel must be used or the chloroform phase must be drained into a breaker and subsequently transferred back to the original separatory funnel. These multiple operations severely jeopardize good quantitive mass transfer.

Only a few improvements have been made in the design of separatory funnels in recent years. One such improvement is disclosed by the U.S. Pat. to Marcus et al., namely No. 3,257,170. While this apparatus is workable it is also subject to certain shortcomings and disadvantages. In the Marcus separator apparatus, a separating funnel is telescopically and removably mounted on the neck portion of a separate container after the immiscible liquids have first been separated in this container. The container (together with the separatory funnel) must then be carefully inverted to avoid remixing of the separate fluids. The lower fluid is then drained off. Not only is it cumbersome to fully invert this apparatus without remixing the separated fluids, but also separatory funnel design is quite fragile. The separatory funnel includes a long and fragile breather tube that extends from the valve housing to almost the bottom surface of the container. This breather tube also requires a venting means to be incorporated into the valve plug thus adding both to the complexity and the cost of this apparatus.

SUMMARY OF THE INVENTION

The present invention solves the previously-mentioned problems by utilizing a whole new concept in a liquid separatory apparatus.

In summary, the liquid separatory apparatus of this invention, which may be utilized for accurately separating immiscible liquids, includes a first chamber having a liquid inlet portion at one end and a three-way stopcock at the other end. The stopcock has first and second tubular arms on one side and a third tubular arm on the opposite side, with this third arm being in communication with the interior of the first chamber. The stopcock further includes an apertured valve plug for alternately connecting the third arm with one and then the other of the first and second arms depending upon the relative rotational position of the plug. A second chamber, which has an opening to atmosphere, is operatively connected with one of the first and second tubular arms while the other of the first and second arms has the end remote from the stopcock open to atmosphere. The apparatus further includes means for closing the first chamber inlet portion, said closure means including an opening to atmosphere. Upon the separation of the liquid within the first chamber into at least two phases of differing density, one of the dense phases may be transferred to the second chamber for storage. Once the remaining liquid is completely drained from the first chamber, the stored phase may be transferred back to the first chamber upon partial inversion of the apparatus.

The closure means preferably comprises a third chamber operatively and removably connected with the first chamber inlet portion. This third chamber has an opening to atmosphere and serves as an overflow reservoir during the transfer of the stored phase back to the first chamber.

One of the major advantages of this new separatory apparatus is that the lower (or denser phase) of the liquids can be reworked or backwashed without transferral to another vessel. Hence, not only is the procedure simplified, but also the risk of sample loss is minimized.

Another advantage of the separator apparatus of this invention is that it permits the analyst to scrub (backwash) the lower phase more efficiently following an extraction. Not only is the extraction procedure more rapid but also it is more accurate because fewer steps are involved and less laboratory ware is used. This advantage will prove especially valuable in laboratories where numerous extractions are completed on a daily basis.

A further advantage of this novel separatory apparatus is that its construction is sturdy enough to permit its use with mechanical shakers.

Yet another advantage of this apparatus is that the vented closure means also functions as a fluid overflow reservoir when transferring fluid from the second chamber back to the first chamber.

Thus, the versatility of this apparatus is quite evident. The second chamber serves as a storage unit for the lower phase while the upper phase is being drained by means of the three-way stopcock. Only a partial inversion of the apparatus is required, with this inversion taking place only after the undesired phase has been drained from the apparatus, thus presenting no phase mixing problems.

Other advantages and features of the invention will appear from the following description taken in connection with the associated drawings.

BRIEF DRAWING DESCRIPTION

FIG. 1 is a front view, with several areas broken away of the liquid separatory apparatus of this invention.

FIGS. 2 and 3 are sections of the stopcock showing the valve plug in two different positions.

FIG. 4 is a sectional view, taken along line 4—4 of FIG. 1, and shows a cross-section of the fluid reservoir of the separatory apparatus of this invention.

DETAILED DESCRIPTION

Referring now to the drawings in detail, and more particularly to FIG. 1 thereof, there is shown a liquid separatory apparatus 10 which has three main components; namely, an apparatus body portion generally designated by numeral 12, a rotatable valve plug 14 and a removable closure means 16.

Apparatus body portion 12, and stopper 16, are made of transparent high strength material and are preferably formed of borosilicate glass such as Corning 7,740. Body portion 12 is constituted of containers 18 and 20 with stopcock body or valve body 22 interposed therebetween. Container or chamber 18, which may be of any desired shape, has an inlet or neck portion 24 at one end an annular outlet portion 26 with bore 27 on the other end. Neck portion 24 has a ground glass surface 25 which is shown as the inner surface thereof, but in the alternative, the outer surface of neck portion 24 may be ground glass instead. Valve body 22, which together with rotatable valve plug 14 defines a threeway stopstock or valve 28, has a tubular inlet portion 30 with a bore 31 on one side, and tubular outlet portions 32, 34, with bores 33, 35 respectively, on the opposite side thereof. Container 18 has outlet portion 26 joined to inlet portion 30 of stopcock 28 so that their respective bores 27 and 31 coincide. A tapered valve bore 36, which extends transversely to the valve inlet and outlet portions, is adapted to receive tapered valve plug 14 having apertures 38, 40 respectively. Rotatably mounted valve plug 14 is held in seated engagement with valve bore 36 by any suitable means. One type, as shown, has the smaller end of plug 14 threaded at 42. Suitable washer 44 and seal means 46 are interposed between valve body 22 and a nut 48 threaded onto the threaded portion 42 of plug 14.

Valve plug 14 is provided at its larger end with a handle 51 for turning. As shown in FIGS. 2 and 3, depending upon the relative rotation of plug 14, tubular inlet portion 30 is alternately connected with one or the other of tubular outlet portions 32, 34. Thus in FIG. 2, plug aperture 38 connects bores 31 and 33 while, upon a 180° rotation of plug 14, in FIG. 3, plug aperture 40 connects bores 31 and 35. A 90° rotation of plug 14 (in either direction) from the position shown in FIGS. 2 and 3 will prevent all communications between bore 31 and bores 33, 35 (see FIG. 1).

Valve body tubular outlet portion 34 has its lower end, i.e., the end removed from valve body 22, attached close to the peripheral edge of a top portion 53 of container 20 so that its outlet bore 35 is in communication with the interior of container 20. While the sole liquid ingress and egress with container 20 is through bore 35, it also has a vent opening or aperture 55 in top surface 53. Aperture 55 is preferably close to the peripheral edge of top surface 53 and spaced 180° from bore 35.

In order to provide smooth flow characteristics and maximum apparatus rigidity a lower section of valve body tubular outlet portion 32 is shown passing vertically through container 20. FIG. 1 shows the lower section of outlet portion 32 passing through top surface 53 and a bottom portion 57 of container 20, with container 20 and outlet portion 32 preferably being coaxial, as shown in FIG. 4.

A closure means generally designated at 16 has a ground glass surface portion 59 which sealingly mates with ground glass surface 25 of neck portion 24 of container 18 to provide a fluid tight joint. If the outer surface of neck portion 24 is ground, then closure means 16 is made to fit over neck portion 24 and an inner surface portion 61 thereof is ground to sealingly mate with outer ground glass surface 25. The cooperating surfaces of container 18 and closure means 16 interconnect to form a fluid tight seal which may be easily assembled and disassembled. Closure means 16 may be of any desired shape but preferably is in the form of a hollow stopper or container having a bulbous body portion 63 and a neck portion 65. Body portion 63 has a vent opening or aperture 67 preferably in the area of its maximum horizontal extent. As shown in FIG. 1 aperture 67 and aperture 55 (in container 20) are preferably aligned, i.e. they lie in the same plane.

In using liquid separatory apparatus 10, container or vessel 18 contains at least two immiscible liquids indicated at 69 and 71 respectively. As an example, an aqueous solution and chloroform are added to container or chamber 18 after plug 14 is rotated out of register with bore 31. Chamber 18 is sealed by closure means 16 and separatory apparatus 10 is thereupon shaken by suitable means for a short period of time to allow the solute of the aqueous solution to be extracted by the chloroform. After shaking, the liquids form two layers, as shown in FIG. 1, with the heavier or denser fluid settling at the bottom. Plug 14 is rotated by means of handle 51 to the position shown in FIG. 3, i.e. so that bores 31, 35 are linked by plug aperture 40. In this position, denser-phase fluid 71 flows from container 18 through tubular outlet 34 into container or chamber 20. Simultaneously, air from the atmosphere will flow both through vent opening 67 into container 18 to replace fluid 71 flowing therefrom and through vent opening 55 out of container 20 to allow fluid 71 to enter the rein. When the end of fluid 71 passes through the small cross sectional outlet portion 26 or container 18, plug 14 is rotated to close bore 31. Since the cross sectional area is small and contiguous to plug 14, great accuracy in isolating the fluids can be obtained. Thus, denser-phase fluid 71 is now separately stored in container or reservoir 20, while lighter-phase fluid 69 separately remains in container 18.

Lighter phase fluid 69 may now be completely drained from container 18 by rotating plug 14 to the position shown in FIG. 2, i.e., so that bores 31, 33 are linked by plug aperture 38. In this position, lighter-phase fluid 69 flows from container 18 through tubular outlet 32 and is collected in any desired manner. Simultaneously, air from the atmosphere will flow through vent opening 67 into container 18 to replace fluid 69 flowing therefrom. Once container 18 is completely drained of fluid 69 plug 14 is rotated to close bore 31, with container 18 now being completely devoid of liquid.

Denser-phase fluid 71, in storage within container 20 may now be transferred back into container 18 by rotating plug 14 back to the position shown in FIG. 3 thereby linking bores 31, 35. Fluid transfer is effected by partially inverting separatory apparatus 10 (which is initially in a vertical position) to the right as indicated by arrow 73 (at handle 51 in FIG. 1) while keeping apparatus 10 in a generally vertical plane so that vent openings 55, 67 are substantially upwardly directed. This partial inversion of apparatus 10 allows fluid 71 to flow from container 20 back to container 18. During this transfer operation the main function of closure means 16, which also serves as a container, is to catch the overflow of fluid 71, while at the same time serving as a pressure relief. Simultaneously while air is exiting through vent opening 67 it is also flowing in through vent opening 55 to replace fluid 71 flowing from container 20. When all of fluid 71 has been transferred to container 18, plug 14 is rotated to close bore 31 and apparatus 10 is returned to its normal position, i.e. the position shown in FIG. 1. Thereupon, fluid 71 may be further treated For example, if a chloroform extraction of an aqueous solution is being completed (i.e. the lower chloroform phase has been drained into container 20, the upper aqueous phase has been discarded, and the chloroform phase has been transferred back into compartment 18,) then at this point two choices are available:

1. An aqueous solution, with conditions properly adjusted, can be employed to scrub the chloroform phase, thus extracting certain undesirable components from it, or 2. The chloroform phase can be back-extracted with an aqueous solution in order to return certain desirable components into an aqueous phase.

The following is a specific example of separating and determining trace concentrations of aluminum in dolomites using separatory apparatus or funnel 10.

EXAMPLE 1

1. Transfer 5.00 ml. of sample stock solution to a beaker.

2. Add 5 ml. 10 percent hydroxylamine hydrochloride solution, 5 ml. 0.2 percent o-phenanthroline, and 5 ml. buffer (pH 5.0).

3. Adjust pH to 5.0 with dilute $NH_4OH$ and transfer to compartment 18 of apparatus 10.

4. Extract with three 5 ml. portions of 1 percent 8-hydroxyquinoline in chloroform and transfer each extract to compartment 20.

5. Discard the aqueous phase by means of three-way stopcock 28.

6. Transfer the combined organic phases back to compartment 18 and scrub once with 15 ml. buffer (pH 5.0). 7. Transfer the lower chloroform layer to a 50 ml. volumetric flask and dilute to volume with chloroform. (8) Measure the absorbance at 390 mu using wi 1 cm. cells.

Thus it may be seen that the separatory apparatus of this invention when used, as for example, for solvent extraction separations, permits the analyst to scrub (backwash) the lower (denser) phase more efficiently following an extraction without transferal to a separate vessel. Hence, not only is the procedure simplified, but also the risk of sample loss through this trans-feral operation is minimized.

It should be noted that the apparatus of this invention may have more than one reservoir 20. For example, a second reservoir could be added (which of course would require a four-way stopcock) which would, for instance, permit two chloroform extractions, each one at a different pH. After discarding the aqueous phase, each chloroform phase could be reworked separately.

While the present invention was indicated as being made of glass, it may be made of plastic or other type materials chemically resistant to the materials being handled.

The invention may be embodied in other specific forms without departing from the spirit or essential characteristics thereof. The construction depicted by the drawings and described above is to be considered illustrative only and not restrictive, with the scope of the invention being defined by the claims appended hereto.

What is claimed is:

1. A liquid separating apparatus for analytical purposes comprising:
   a. a first container having a neck portion at one end with the other end of said first container tapering inwardly to form a first container outlet portion having a longitudinally extending bore;
   b. a stopcock having an inlet portion and first and second outlet portions, said inlet and outlet portions having longitudinally extending bores with said inlet portion being affixed to said first container outlet portion so that their respective bores coincide, said stopcock having a valve bore separating said inlet and outlet portions with said valve bore extending transverse to said inlet and outlet portions, said stopcock also having a manually rotatable plug disposed in said valve bore and including first and second apertures extending therethrough for alternately connecting said inlet bore with one and the other of said first and second outlet bores depending upon the relative rotational position of said plug;
   c. a second container affixed to, and in communication with the bore of, one of said stopcock first and second outlet portions, said second container having a vent opening; and
   d. means for closing said first container neck portion, said closure means having a vent opening, wherein upon the separation of said liquid within said first container into separate phases said second container serves as a storage reservoir for the lower liquid phase while the upper liquid phase is drained from said apparatus and said closure means also serves as a vent during the transfer of said lower liquid phase back into said first container.

2. The liquid separating apparatus of claim 1 wherein said closure means comprises a third container detachably and operatively secured in fluid-tight relationship to said first container neck portion, said third container having a vent opening and serving as a vented over-flow reservoir during the transfer of said lower liquid phase back into said first container.

3. The liquid separating apparatus of claim 1 wherein said closure means comprises a hollow stopper having a bulbous body portion and an open-ended neck portion, said neck portion being detachably and telescopically secured to said first container neck portion, with said body portion having a vent opening.

4. A liquid separatory funnel for solvent extraction separations comprising:
   a. a first chamber having a liquid inlet portion at one end and a three-way stopcock at the other end, said stopcock having first and second tubular arms on one side and a third tubular arm on the opposite side, said third arm being in communication with the interior of said first chamber, said stopcock including an apertured rotatable plug for alternately connecting said third arm with one and the other of said first and second arms depending upon the relative rotational position of said plug;
   b. a second chamber operatively connected with one of said first and second tubular arms, said second chamber having an opening to atmosphere, with the other of said first and second tubular arms having the end remote from said stopcock open to atmosphere; and
   c. means for closing the first chamber liquid inlet portion, said closure means having an opening to atmosphere, wherein upon the separation of said liquid within said first chamber into at least two phases of differing density, one of the denser phases may be transferred to said second chamber for storage whereupon, after the remaining liquid is completely drained from said first chamber, said stored phase is transferred back to said first chamber upon partial inversion of said funnel.

5. The liquid separatory funnel of claim 4 wherein said closure means comprises a third chamber operatively and removably connected with said first chamber inlet portion, said third chamber having an opening to atmosphere and serving as an overflow reservoir during the transfer of said stored phase back to said first chamber.

6. The liquid separatory funnel of claim 4 wherein a portion of the other of said first and second tubular arms extends through said second chamber.

7. The liquid separatory funnel of claim 4 wherein said second chamber surrounds and is coaxial with a portion of the other of said first and second tubular arms.

8. The liquid separatory funnel of claim 5 wherein the liquid storage capacity of each of said second and third chambers is smaller than that of said first chamber.

9. A liquid separatory apparatus for analytical purposes comprising;
   a. a first compartment having an inlet portion on one end and an outlet portion on the other end, said first compartment serving to initially contain said liquid during the separation thereof into at least two liquid phases of differing density;
   b. at least one additional compartment having an inlet portion and an opening to atmosphere;
   c. valve means for operatively and separably connecting said first compartment outlet portion with the additional compartment inlet portion and with valve means drain portion open to atmosphere, said valve means being fixed interposed between said first and additional compartments; and
   d. means for closing said first compartment inlet portion, said closure means having an opening to atmosphere, wherein each additional compartment serves as a separate storage reservoir for each desired phase of differing density while the undesired phases are drained from said apparatus, with each of said stored phases thus being separately transferable back to said first compartment upon partial inversion of said apparatus.

10. The liquid separatory apparatus of claim 9 wherein said closure means comprises a separate compartment operatively and detachably connected with said first compartment inlet portion, said separate compartment having a vent opening and serving as an overflow reservoir during the transfer of said stored phases back to said first compartment.

11. Liquid separatory apparatus for analytical purposes comprising:
   a. chamber means for receiving a plurality of immiscible liquids to be separated;
   b. closure means communicating with one end of said chamber means;
   c. valve means having one inlet portion and a plurality of outlet portions, said inlet portion being attached to and communicable with an opposite end of said chamber means;
   d. discharge means attached to said valve means and communicable at one end with one of said outlet portions and communicable at the opposite end with the atmosphere; and
   e. container means attached to and communicable with another of said outlet portions, said container means being adapted for receiving one of the separated phases of liquid contained within said chamber means, said valve means being adapted for selectively communicating said chamber means with said container means and said discharge means as well as for closing off said opposite end of said chamber means.

12. Liquid separatory apparatus as defined in claim 11 including vent means formed both in said closure means and said container means for separately venting said closure means and said container means to the atmosphere.

13. Liquid separatory apparatus as defined in claim 11 wherein said discharge means is in the form of a tubular conduit that extends concentrically through said container means.

* * * * *

UNITED STATES PATENT OFFICE
CERTIFICATE OF CORRECTION

Patent No. 3,656,912     Dated April 18, 1972

Inventor(s) Ken F. Sugawara

It is certified that error appears in the above-identified patent and that said Letters Patent are hereby corrected as shown below:

Column 1, line 68, "dense phases" should read --denser phases--; Column 2, line 8, "separator apparatus" should read --separatory apparatus--; Column 2, line 36, "away of" should read --away, of--; Column 2, line 53, "7,740." should read --7740.--; Column 2, line 57, "one end an" should read --one end and an--; Column 2, line 62, "stopstock" should read --stopcock--; Column 3, line 61, "the rein." should read --therein.--; Column 4, line 23, "treated For" should read --treated. For--; Column 4, under Example 1, lines 54-56 "7. Transfer the lower chloroform layer to a 50 ml. volumetric flask and dilute to volume with chloroform." should be indented as a new paragraph; Column 4, lines 56, 57 "(8) Measure the absorbance at 390 mu using wi 1 cm. cells." should be indented as a new paragraph and should read as follows --8. Measure the absorbance at 390 mu using 1 cm. cells.--; Column 6, line 32, "being fixed" should read --being fixedly--;

Signed and sealed this 19th day of September 1972.

(SEAL)
Attest:

EDWARD M. FLETCHER, JR.
Attesting Officer

ROBERT GOTTSCHALK
Commissioner of Patents